Jan. 8, 1924. 1,480,158
A. B. ELLIS
SIGNAL FOR VEHICLES
Filed Feb. 24, 1923  2 Sheets-Sheet 1
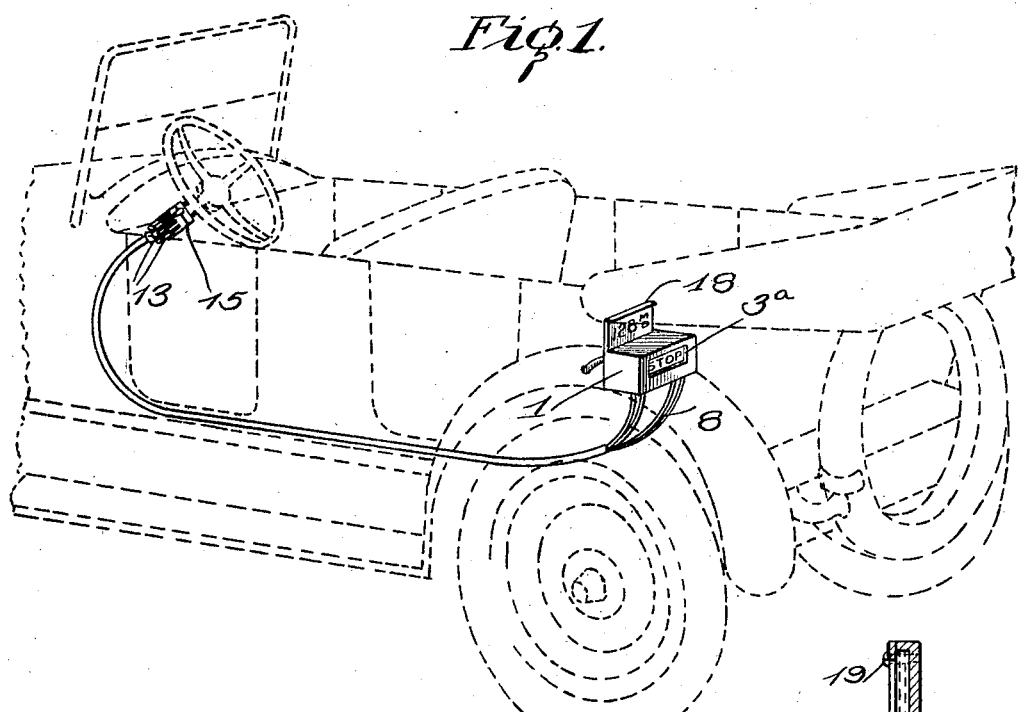
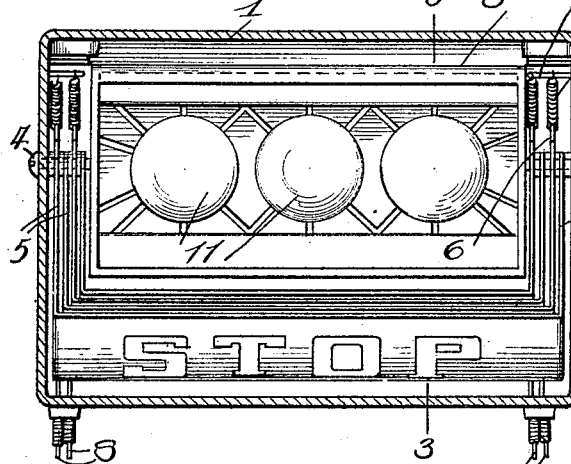
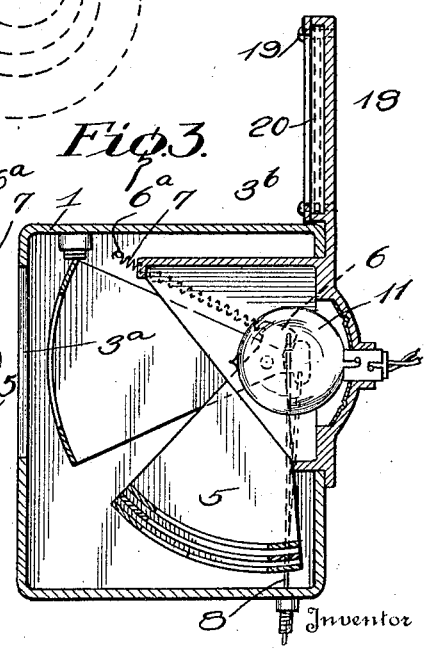
Inventor
A. B. Ellis
By L. P. Gorin
Attorney Jan. 8, 1924. 1,480,158
A. B. ELLIS
SIGNAL FOR VEHICLES
Filed Feb. 24, 1923 2 Sheets-Sheet 2
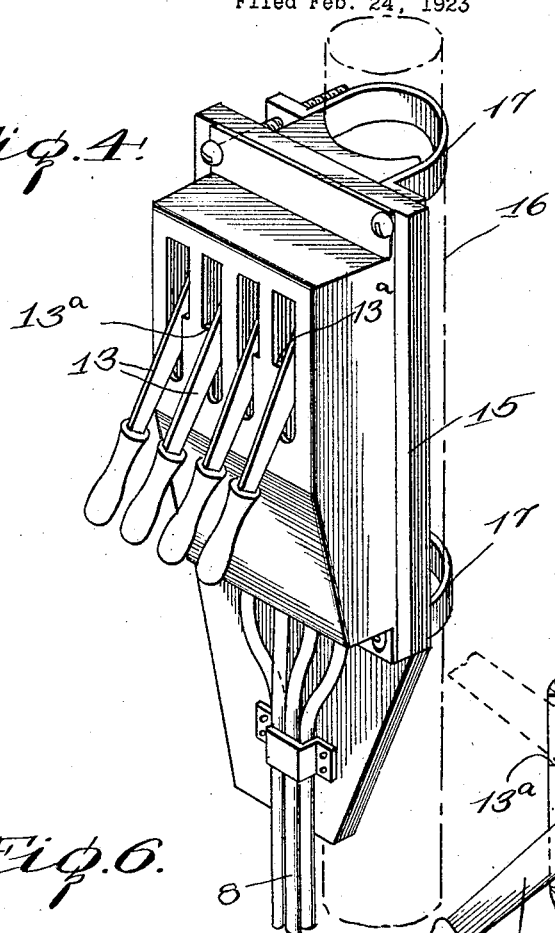
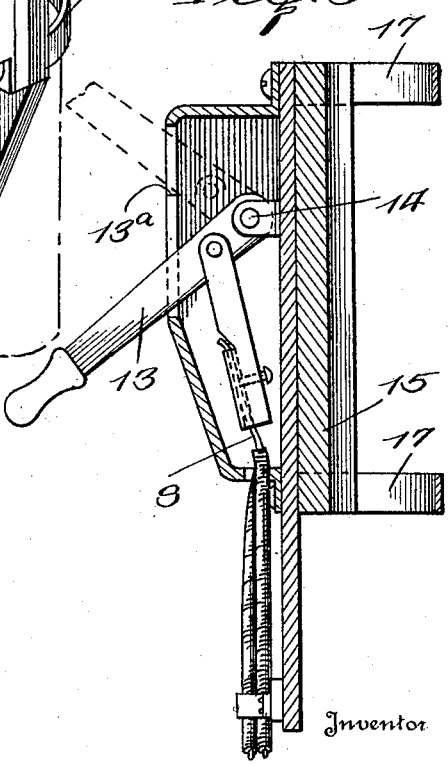
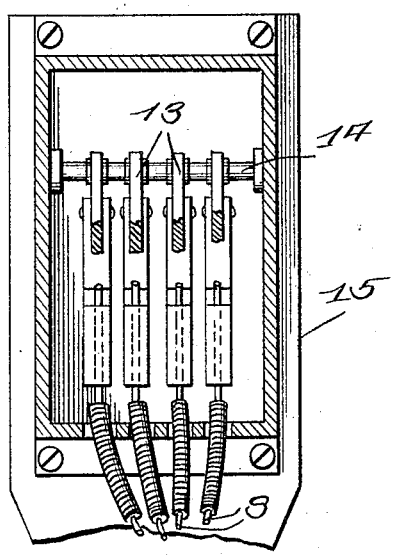
Inventor
A. B. Ellis
By
Attorney Patented Jan. 8, 1924.

1,480,158

UNITED STATES PATENT OFFICE.

ARTHUR B. ELLIS, OF SEATTLE, WASHINGTON, ASSIGNOR TO THE RELIABLE SIGNAL CO., A CORPORATION OF WASHINGTON.

SIGNAL FOR VEHICLES.

Application filed February 24, 1923. Serial No. 621,039.

*To all whom it may concern:*

Be it known that ARTHUR B. ELLIS, a citizen of the United States, residing at Seattle, in the county of King and State of Washington, has invented certain new and useful Improvements in Signals for Vehicles, of which the following is a specification.

This invention relates to signals for vehicles to warn those coming up behind the vehicle of the intended movements of the driver.

One of the objects of the invention is to provide convenient means whereby to indicate to those in the rear of a vehicle that the driver intends to stop, turn to the right, left, et cetera.

Another object of the invention is to provide a signal of this character, which is simple in construction, strong and durable, and effective for the purpose intended.

A still further object of the invention is to provide a construction that is very compact and is so arranged as to form a suitable support for the usual license plate, and one which is equally efficient in the dark as in the light.

Other objects and advantages will appear as the invention is hereinafter more fully described in the following specification, shown in the accompanying drawings and finally pointed out in the appended claim.

In the drawings:

Fig. 1 is a view showing the application of the invention.

Fig. 2 is a view looking from the rear but showing the housing in section.

Fig. 3 is a transverse section on the line 3—3 of Fig. 2.

Fig. 4 is a perspective view of the operating means.

Fig. 5 is a vertical section of the same.

Fig. 6 is a section on the line 6—6 of Fig. 5.

Referring now to the drawings, numeral 1 indicates a housing of suitable shape, and which may be firmly secured to the rear of the vehicle. 3 indicates an opening formed in the front wall of the housing, and inserted through the front of the housing is a frame 3ª which receives screws 4 extending from the sides of the housing. Mounted on the screws 4 are shutters 5, which are in the form of bales, each being provided at one end with a projection 6, to which is attached one end of a spring 7, the opposite end of the spring being attached to the housing at 6ª. The shutters are of such shape and proportion as to be nested, one within the other when the parts are in normal position, it being of course understood that all the shutters are provided with springs to hold them in such normal position as partially shown in Fig. 3.

The horizontal portion of each shutter is cut out to form words, the successive shutters indicating left, right, stop, slow, et cetera, to indicate the movement of the car when the horizontal portion of a shutter is thrown up between the rear opening 3ª and lamps 11 at the rear of the housing. To the projection 6 of each shutter is attached one end of a flexible shaft 8 housed in a sheath, there being one wire for each shutter, the other ends of the wires being extended forwardly. By reference to Fig. 3, the bale-like formation of the shutters will be apparent, the entire group of shutters being nested as shown in that figure, so that each shutter can move about the common pivots independently of all the other shutters.

The flexible shafts 8 run to the forward end of the vehicle, and the wires in the shafts are connected to levers 13 pivoted at 14 to a framework 15, which in this instance, is removably secured to the steering post 16 of the vehicle by straps 17. Each lever operates in a slot having a flange 13ª which acts as a latch to hold a signal in operative position, if desired.

When the driver of the vehicle desires to turn to the left for example, he operates one of the levers 13 marked "Left" which pulls on the wire connected to that lever and the appropriate shutter. Such pulling on the wire will cause the particular shutter to which that wire is connected to move about the screws 4 as a center into its position shown in full lines to the left of Fig. 3, which, if it be daylight, will clearly show to anyone in the rear of the vehicle that the driver intends to turn to the left, because the outlines of the word "Left" will be plainly visible, being exposed through the opening 3ª. If it be dark, the word "Left" will be clearly visible because of the light from the lamps 11, which are in the rear of the group of shutters and in alignment with the cut-out letters when the shutters are in operative position. It will be understood, of course, that when none of the shutters are in operative position, the light will shine through the opening 3ª continuously, and serve as the usual tail light, so that the device in fact combines the uses of a tail light, a signal device, and a license plate holder, all in a unitary article, as stated. Of course when a shutter is operated, its spring is tensioned and when pull on the lever is reversed, the spring will return the shutter to normal position.

The entire device is susceptible of being stamped out by the die and punch process, or of course, the parts may be made of light castings.

A license plate may be attached to the rear of the housing below the opening 3ª, or there may be an extension or frame 18 on the fore-part of the housing, to which the license plate 20 may be fastened as by screws 19.

While I have shown and described a particular form of embodiment of my invention, I am aware that many minor changes therein will readily suggest themselves to others skilled in the art without departing from the spirit and scope of my invention, and I, therefore, desire to avoid being limited to the exact form of embodiment which I have herein shown and described.

What I claim is:

A signal device for vehicles, comprising a housing formed with front and rear openings, a plurality of nested bails mounted in the housing, the transverse portion of each bail being cut out to indicate a signal, trunnions extending from the sides of the housing to support the bails, lugs extending from each bail, springs connected to the rear portion of the lugs and secured at their front ends to the housing, flexible means connected to the forward ends of the lugs for operating the bails, a bumper at the top of the housing against which the bails contact when thrown up into signal position, a frame supported in the forward opening in the housing, said frame having depressions and sockets for lamps to illuminate the interior of the housing, the frame having an extension projecting above the housing to form a license support, and means for securing the frame to the housing.

In testimony whereof I affix my signature.

ARTHUR B. ELLIS.